US006981509B2

(12) United States Patent
Sharapov

(10) Patent No.: US 6,981,509 B2
(45) Date of Patent: Jan. 3, 2006

(54) PROTECTIVE COVER FOR A VEHICLE

(76) Inventor: Sergey Sharapov, 18 Dorado Ter. #7, San Francisco, CA (US) 94112

( * ) Notice: Subject to any disclaimer, the term of this patent is extended or adjusted under 35 U.S.C. 154(b) by 4 days.

(21) Appl. No.: 10/658,917

(22) Filed: Sep. 11, 2003

(65) Prior Publication Data

US 2005/0055886 A1 Mar. 17, 2005

(51) Int. Cl.
*B60J 11/00* (2006.01)

(52) U.S. Cl. ................................ 135/88.11; 135/88.05; 135/88.08; 52/3; 296/98; 296/136.11; 160/370.22; 150/166; 114/361

(58) Field of Classification Search ............. 135/88.05, 135/88.08, 88.11; 52/3, 23, DIG. 12; 150/166; 296/136.1, 136.11, 98; 114/361; 160/238, 160/264, 370.22

See application file for complete search history.

(56) References Cited

U.S. PATENT DOCUMENTS

| | | | | | |
|---|---|---|---|---|---|
| 1,918,423 | A * | 7/1933 | Persinger | ..................... | 160/24 |
| 2,390,986 | A * | 12/1945 | Burns | ......................... | 114/361 |
| 2,797,697 | A * | 7/1957 | Gilmore, Jr. et al. | ....... | 114/361 |
| 3,050,075 | A * | 8/1962 | Kaplan et al. | ................ | 296/98 |
| 3,316,012 | A * | 4/1967 | Thier | ...................... | 296/136.1 |
| 3,992,053 | A | 11/1976 | Hrytzak et al. | | |
| 4,075,723 | A * | 2/1978 | Bareis et al. | ............... | 114/361 |
| 4,184,501 | A * | 1/1980 | Johnson | ................... | 135/88.08 |
| 4,480,652 | A * | 11/1984 | Gooch | ..................... | 135/88.01 |
| 4,720,135 | A * | 1/1988 | Farina | .................. | 296/136.03 |
| 4,805,654 | A | 2/1989 | Wang | | |
| 4,834,446 | A | 5/1989 | Tung-Chow | | |
| 4,848,823 | A * | 7/1989 | Flohr et al. | ................... | 296/98 |
| 4,929,016 | A * | 5/1990 | Kastanis | ................ | 296/136.03 |
| 4,971,384 | A * | 11/1990 | Baldwin | ...................... | 296/98 |
| 5,097,548 | A * | 3/1992 | Heck et al. | .................... | 5/482 |
| 5,174,073 | A * | 12/1992 | Sabo | ............................... | 52/3 |
| 5,176,421 | A * | 1/1993 | Fasiska | .................. | 296/136.03 |
| 5,516,181 | A | 5/1996 | Thompson | | |
| 5,615,924 | A * | 4/1997 | Owen | ........................ | 296/95.1 |
| 5,927,793 | A * | 7/1999 | McGrath, Jr. | .......... | 296/136.13 |
| 6,276,381 | B1 | 8/2001 | O'Brein | | |
| 6,412,851 | B1 * | 7/2002 | Burks et al. | .................. | 296/98 |
| 6,682,123 | B2 * | 1/2004 | Burks et al. | .................. | 296/98 |
| 6,789,495 | B2 * | 9/2004 | Brower et al. | .............. | 114/361 |
| 2004/0238089 | A1 * | 12/2004 | Li et al. | ..................... | 150/166 |

* cited by examiner

*Primary Examiner*—Robert Canfield

(57) ABSTRACT

A protective cover for a vehicle comprising a sheet or a web of a flexible material that possesses a property of buckling or curving in the upward direction from the vehicle with the formation of a canopy-type shield for protecting the vehicle from direct sun rays, birds' droppings, etc. The sheet has a length exceeding the length of the upper surface periphery of the vehicle so that the upwardly curved canopy is formed either by applying two oppositely directed forces to the opposite ends of the sheet or by prestressing the sheet. The sheet can be made from plastic or a fabric that incorporates springing metal strips that tend to curve upward when they are in a free state. The sheet can be conveniently stored in wound state in a cylindrical cassette. Storage of the flexible material in a wound state enhances the property of bucking or curving when the sheet is withdrawn from the cassette.

7 Claims, 3 Drawing Sheets

PROTECTIVE COVER FOR A VEHICLE

FIELD OF THE INVENTION

The present invention relates to vehicle covers, and in particular to canopy-type vehicle covers. The cover pertaining to the invention can be used for protection of a vehicle parked in open air from heat, sunrays, birds' droppings, and hail.

BACKGROUND OF THE INVENTION

In many countries, the automobile has become the most common method of transportation. Most automobiles are manufactured primarily of metal, and the metal is painted to protect it from oxidation and other influences detrimental to the finish. Automobile surface finish degradation may be caused by sun rays, bird droppings, tree sap and pollens, snow and ice, frost, etc.

One way to prevent damage to the surface finish of an automobile is to store the car in a garage when it is not being used. Unfortunately, there are many more cars than garages, so this solution leaves many cars outdoors.

U.S. Pat. No. 4,805,654 issued in 1989 to Kuo-Hsin-Wang provides an umbrella-type sun shield for automobiles. The sun shield has a collapsible framework for supporting a flexible cloth. The framework has at least three legs radially and isometrically extended from the framework. In the free end of each leg, there is a sucker adapted to attach to the roof of an automobile. Therefore, the shield can be mounted above an automobile to shade it from the unpleasant and damaging effects of the sun's rays, and it can be detached from the roof of the automobile and folded into the trunk of the automobile.

This device has a complicated construction and can be blown out from the roof of the vehicle by gusts of winds. The installation and removal of the device requires opening and closing of the umbrella-type mechanism. If the metal spikes of the shield are bent, e.g., by the wind gusts, the damage becomes irreversible and the device has to be discarded.

Tung-Chow was granted U.S. Pat. No. 4,834,446 issued in 1989 for a road vehicle flexible cover, which is stored in a box in the vehicle trunk. While this design provided for motorized retraction of the cover, its storage box occupied a substantial amount of the trunk floor space, right in the center part of the trunk floor. In addition, this design requires that the trunk be opened and closed every time the cover is deployed or stored. The '446 design is also necessarily complex because it uses an electric motor with an electrical wire running to the dash of the vehicle. The protective canvas comprises a folded bundle, which, after unwinding from the storage box, has to be unfolded for covering the top and sides of the vehicle. Furthermore, the cover of this type does not provide a space between the cover and the vehicle body so that the cover of this type does not protect the vehicle from heating.

One variant of the vehicle cover solution is the self-storing vehicle cover. This type of cover is typically provided in a container, which may be used to store the cover. When the cover is to be used, the cover is removed from the container, and when the cover is to be stored, it is returned to the container. A number of self-storing vehicle covers have been patented, but they all suffer from various problems.

For example, U.S. Pat. No. 5,516,181 granted to Thompson in 1996 discloses a roll-up vehicle cover. This cover could be rolled up around a cylinder, which could then be stored in the vehicle's trunk. While this design is provided for a storable cover, it is inconvenient and cumbersome to use, because after use, the cover has to be removed from the vehicle roof, manually rolled up, the bundle carried to the trunk of the vehicle, the trunk opened, the bundle placed inside, and the trunk closed. Deployment of this cover requires all these steps to be performed, but in the reverse order. Since in a covered position of the vehicle very small air spaces are formed between the cover and the upper surfaces of the vehicle body, the air in these spaces is quickly heated and functions as a medium for transfer of heat from cover to the vehicle.

U.S. Pat. No. 6,276,381 issued in 2001 to P. O'Brein discloses a vehicle cover that may be stored in a convenient place such as the car trunk, then taken out and unfolded, and then installed on the vehicle. The cover is made of a fabric or textile such as canvas. When the vehicle must be used, the cover is removed, allowed to dry (if necessary), folded up, and stored. One problem associated with this design is inconvenience: it takes time to fold and unfold, and store, the vehicle cover. Furthermore, if the vehicle is located in a country with a very hot climate, under the effect of direct sun rays which are substantially perpendicular to the upper surface of the cover, at the noon time the interior of the vehicle covered with the protective cover of the type disclosed in U.S. Pat. No. 6,276,381 may be heated to a very high temperature due to a green-house effect caused by the cover. Since the entire body of the vehicle is covered from all sides, the spaces between the vehicle and the cover are not ventilated.

Another way to help preserve the finish on an automobile or other vehicle is to cover the vehicle with a vehicle cover when it is not in use. For example, U.S. Pat. No. 3,992,053 issued in 1976 to L. D. Hrytzak, et al. discloses a sun shield for automobiles that comprises a strip of screening material, which is stored on a roller within a cylindrical container attached to the automobile. When in use, the material is drawn out of the container through a slit therein, and is pulled over the automobile and attached at its free end to the automobile so that the roof is shielded. The screening material is kept spaced from the automobile bodywork by means of legs, which fold up when the sun shield is stored. A disadvantage of this device is that for forming a ventilated space between the cover material and the surface of the vehicle body, the device requires the use of an additional structure in the form of foldable legs, which has to be permanently stored in the vehicle's trunk.

OBJECTS AND SUMMARY OF THE INVENTION

It is an object of the present invention to provide a canopy-type vehicle cover for protecting a vehicle from overheating, direct sun rays hail, etc., which is simple in construction, inexpensive to manufacture, convenient in use, occupies a small space in storage, and provides a ventilated space between the cover material and the upper surfaces of the vehicle body.

The protective cover of the invention is extremely simple in its structure and comprises a sheet or a web of a flexible material, which is subject to buckling when two opposite forces are applied to the opposite ends of the sheet. Preferably, the flexible material is stored in wound form, e.g., wound on a core and located in a cylindrical cassette with a slit for pulling out the flexible material. For retracting the material back into the cassette, the inner edge of the flexible sheet can be connected to a spiral spring. The flexible material itself should posses the property of buckling or curving up when it is pulled out and released from the cassette. This property can be imparted to the flexible material by pre-stressing the material or by providing it with longitudinally arranged resilient thin metal strips similar to the one used in a measure tape. The property of buckling up is enhanced by storing the flexible cover or the fabric with flexible metal strips, e.g., with springing properties, in a wound state.

In general, the length of the sheet or web should be greater than the peripheral length of the upper surface of the vehicle including the trunk, roof, and hood. This is necessary to compensate for bulging the sheet up under conditions of application of opposite forces. For securing the ends of the bulged cover to the vehicle, the device is provided with hooks connected to the free end of the sheet or web and to the casing of the cassette.

In order to compensate for the sail force that can act onto the inner surface of the cover during a windy weather, the surface of the cover may be provided with valves in the form of slits that could be opened under the pressure of air generated by the wind.

In use, the cover of the invention forms a canopy-type protective shield above the vehicle with a space between the vehicle and the material of the cover sufficient for reliable ventilation of air. Such space is automatically formed and constantly maintained due to aforementioned pre-stressed condition of the flexible material of the cover. Storage of the sheet or web in a wound state enhances the aforementioned pre-stressed condition.

The sheet or web can be made from plastic, or may comprise a fabric with springing preliminarily tensioned strips (such as those in a measure tape) attached to the fabric and imparting to it a convex shape when released from the constrained state.

DETAILED DESCRIPTION OF THE INVENTION

Figure 1:
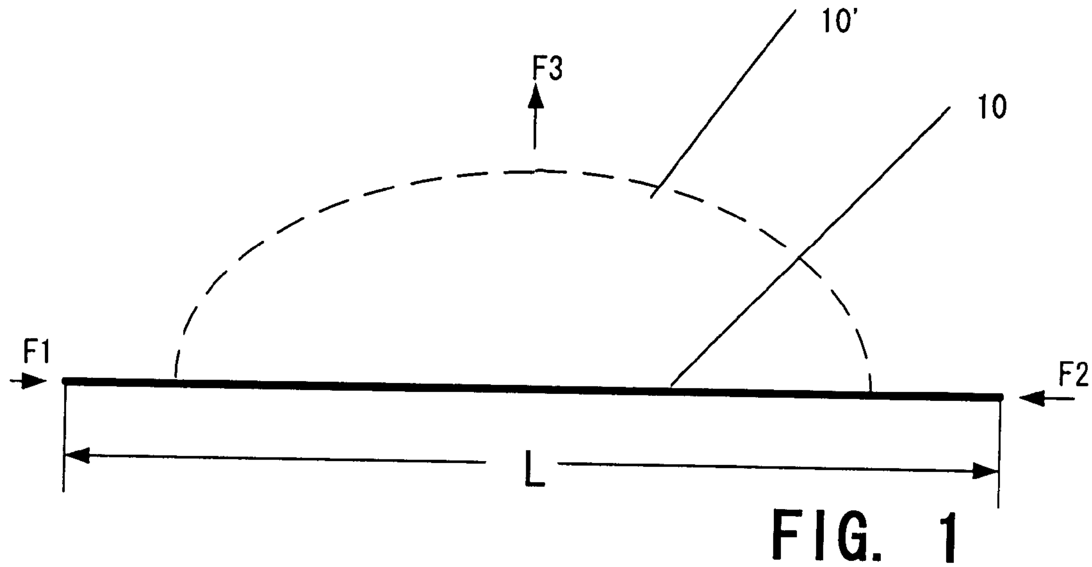
FIG. 1 is a schematic view illustrating the principle of the invention.

FIG. 1 is a schematic view illustrating the principle of the invention. In its simplest form, a device of the invention comprises a sheet 10 of a flexible material that possess some longitudinal rigidity, preferably to the extent sufficient for the sheet to resist sagging under the effect of gravity. The sheet 10 can be made, e.g., of a plastic, e.g., such as polypropylene, polyvinylchloride, etc., having a thickness, e.g., within the range of 0.1 mm to 10 mm. What is meant under the term "flexible material" is that when two opposite forces F1 and F2 sufficient to overcome longitudinal rigidity of the flexible sheet 10 are applied to the opposite edges of the sheet, the latter is buckled or curved upward and assumes the shape shown by a broken line 10' in FIG. 1 under the effect of a resulting bending force F3 acting in the direction of arrow V shown in FIG. 1.

The sheet 10 can be prestressed so that in a free state it will automatically assume, under the effect of internal stress of the material of the sheet, the curved shape shown in FIG. 1 by broken line 10'.

Figure 2:
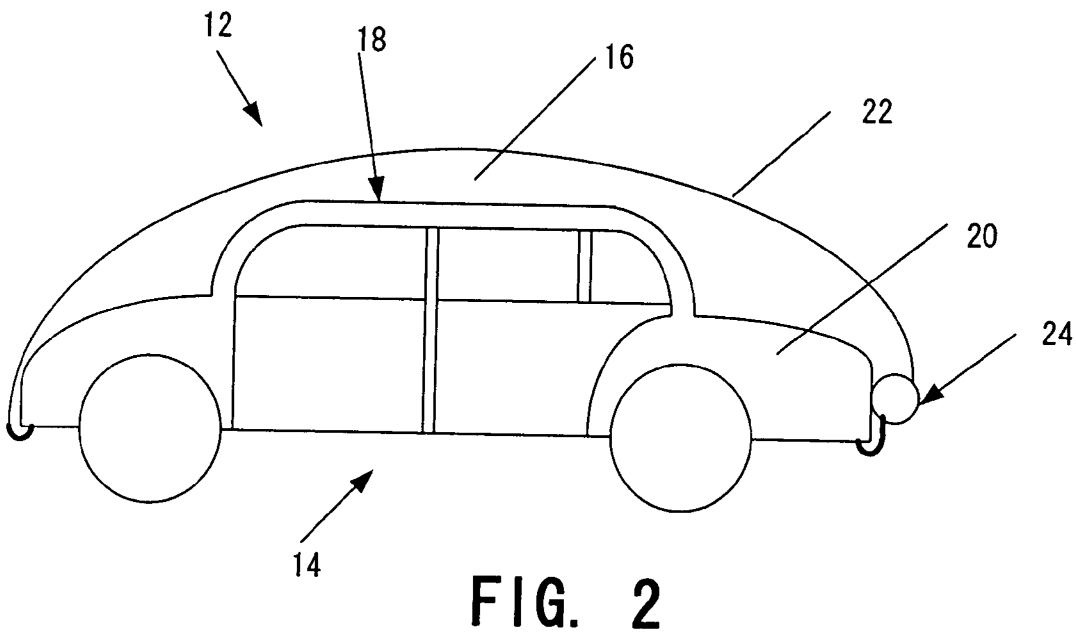
FIG. 2 is a side view of a canopy-type protective cover of the invention in a working position on a vehicle.

FIG. 2 is a side view of a canopy-type protective cover 12 of the invention in a working position on a vehicle 14. It can be seen from FIG. 2 that a laterally open space 16 is formed between the upper surface 18 of the vehicle body 20 and the inner surface of the flexible sheet or web 22 of the device of the invention. The space 16 should be sufficient to provide natural ventilation of air through this space, e.g., under the effect of a wind. For example, the space may be within the range from 1 cm to 100 cm, preferably from 30 cm to 50 cm.

The length L of the sheet or web 22 in a flat state (sheet 10 in FIG. 1) should be greater, e.g., by 10 to 100%, than the peripheral length of the upper surface 18 of the vehicle 14 (FIG. 2).

Figure 3:
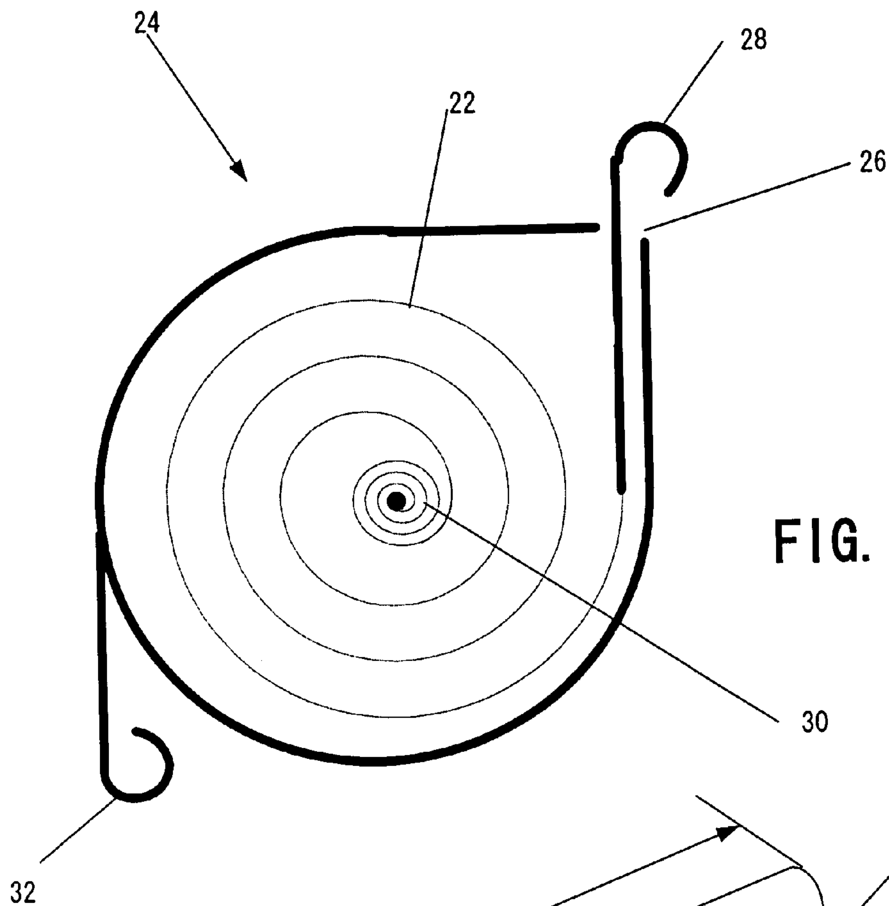
FIG. 3 is a sectional view of a cassette of the device of the invention for storing the protective plate or web in a wound state.
Figure 4:
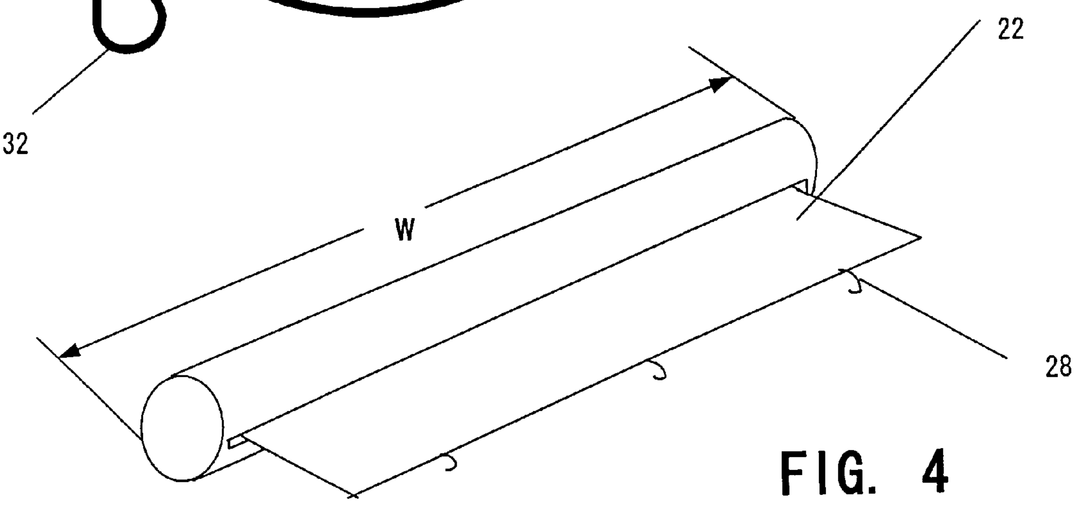
FIG. 4 is a three-dimensional view of the device of the invention in a non-operative state.

As can be seen from FIG. 2, in a preferred embodiment of the invention, the device is provided with a cassette 24 for storing the sheet or web 22 in a wound state. FIG. 3 is a sectional view of the cassette 24. The cassette has a width W (see FIG. 4 which is a three-dimensional view of the device of the invention in a non-operative state) that is preferably shorter than the width of interior compartment of the vehicle's trunk. One end of the wound prestressed sheet or web 22 protrudes through a transverse slit 26 of the cassette 24 and is provided with a hook (hooks) 28 or other attachment means for attachment to the vehicle body 20, while the opposite or inner end of the sheet or web 22 is connected to a spring, e.g., a compression spiral spring 30 that always tends to withdraw the extended sheet or web 22 back into the cassette 24. Reference numeral 32 designates another hook (or hooks) connected to the outer side of the cassette 24 for securing the device of the invention to the side of the vehicle opposite to the one used for the attachment of the hook (hooks) 28.

Figure 5:
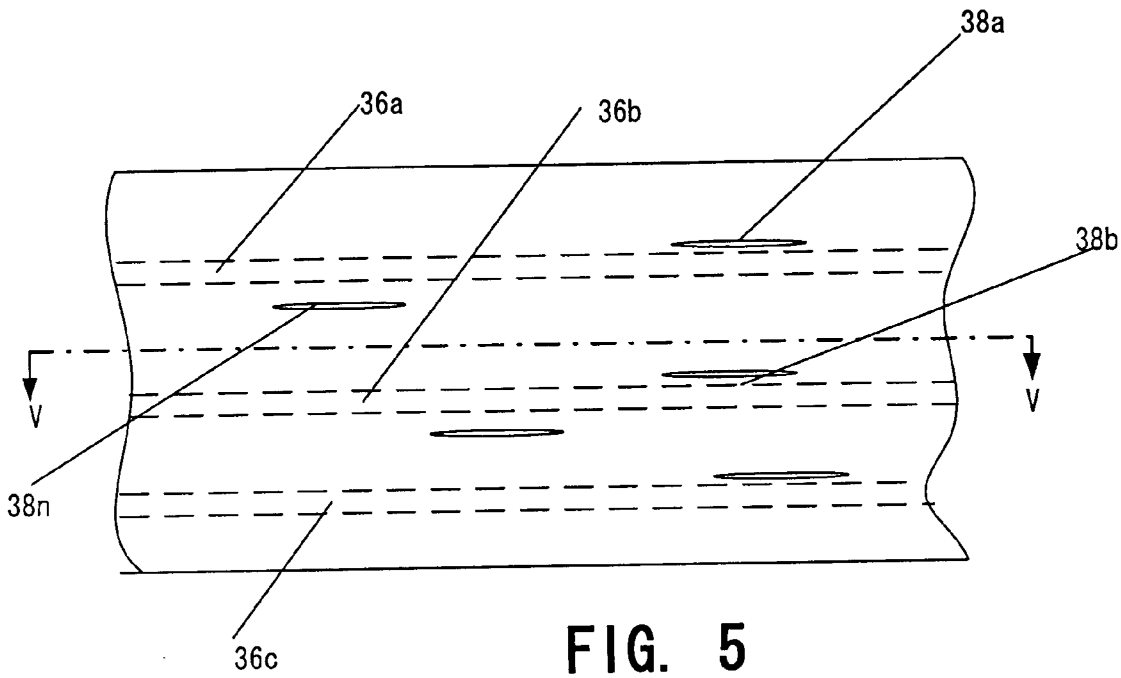
FIG. 5 is a top view on a part of a sheet or web used in a device according to the second embodiment of the invention.
Figure 6:
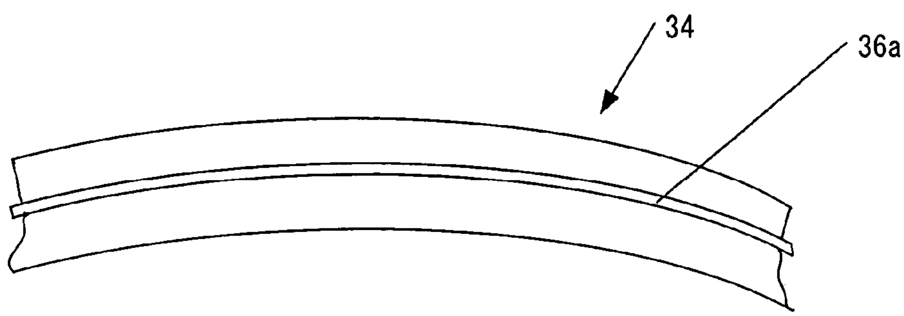
FIG. 6 is a sectional view along line V—V of FIG. 5.

The property of buckling or curving up when the sheet or web is pulled out and released from the cassette can be imparted to the flexible material by providing the material with longitudinally arranged resilient thin metal strips similar to the one used in a measure tape. The embodiment with such features is shown in FIGS. 5 and 6, where FIG. 5 is a top view on a part of a sheet or web 34 used in the vehicle cover device of the invention, and FIG. 6 is a sectional view along line V—V of FIG. 5. The material of the web 34 incorporates pre-stressed flexible strips 36*a*, 36*b*, 36*c*, . . . . These strips can be made from a stainless steel or plastic with springing properties. The web 34 can be made from a waterproof fabric. When the web is pulled out from the cassette (not shown in FIGS. 5 and 6), the pre-stressed metal strips tend to assume the upwardly curved shape shown in FIG. 6. In order to compensate for the sail force that can act onto the inner surface of the web 34 during a windy weather, the web may be provided with slits 38*a*, 38*b*, . . . 38*n* that function as valves that could be opened under the pressure of air generated by the wind.

In use, the covers 10, 12, and 34 of all embodiments of the invention form canopy-type protective shields above the vehicle with a space 16 (FIG. 1) between the vehicle and the material of the cover sufficient for reliable ventilation of air. Such space is automatically formed and constantly maintained due to aforementioned pre-stressed condition of the flexible material of the cover. The sail force developed by wind gusts is attenuated by the provision of slits 38_a_, 38_b_, . . . 38_n_ that could be opened under the pressure of air. Storage of the sheet or web in a wound state enhances the aforementioned pre-stressed condition.

Thus it has been shown that the invention provides a canopy-type vehicle cover for protecting a vehicle from overheating, direct sun rays hail, etc., which is simple in construction, inexpensive to manufacture, convenient in use, occupies a small space in storage, and provides a ventilated space between the cover material and the upper surfaces of the vehicle body.

Although the invention has been described with reference to embodiments having specific materials and shapes of the parts of the cover, it is understood that these embodiments were given only as examples and that any modifications and changes are possible, provided they do not depart from the scope of the patent claims attached below. For example, the device may consist of two symmetrically arranged cassettes with the opposite ends of the web material attached to spiral springs inside the cassettes. The material of the sheet or web may be a resilient plastic of the type other than those mentioned in the description. The material may be a fabric impregnated with a composition that imparts to the material resilient properties. The cassettes themselves may be made molded from plastic or may be made of fabric in the form of hood. The use of the cover of the invention is not limited to the vehicles only and the cover may be used as a tent for camping, as a shade against sun rays for kiosks, playgrounds, etc. The pre-stressed material may be stored in a non-wound state.

What is claimed is:

1. A protective cover for a vehicle comprising:

a sheet of a flexible material having a length, a width, and opposite ends, said sheet possessing a property of buckling or curving in the upward direction from said vehicle with the formation of a laterally open space between said vehicle and said sheet, said vehicle having an upper surface with an upper surface periphery;

securing means connected to said opposite ends for securing said opposite ends to said vehicle; and at least one cassette with a slit having a width equal to or greater than said width of said sheet, said sheet being stored in said cassette in a wound state;

said length being greater that the length of said upper surface periphery of said vechicle, said buckling being caused by two oppositely directed forces applied to said opposite ends.

2. The protective cover of claim 1, wherein said cassette is provided with a compression spring which is connected to one of said opposite ends of said sheet and tends to withdraw said sheet into said cassette through said slit, the other of said opposite ends supporting said securing means.

3. The protective cover of claim 2, wherein said securing means are hooks.

4. The protective cover of claim 3, wherein said sheet has valves for passing air under the effect of wind, said valves comprising slits through said flexible material.

5. The protective cover of claim 1, wherein said securing means are hooks.

6. The protective cover of claim 1, wherein said flexible material is selected from the group consisting of plastic and fabric with means for imparting said fabric said property of buckling or curving, said sheet having valves for passing air under the effect of wind, said valves comprising slits through said flexible material.

7. The protective cover of claim 6, wherein said means for curving said fabric in said upward direction from said vehicle comprises metal strips with springing properties, said strips being pre-stressed for buckling up in a free state.

* * * * *